(12) United States Patent
Fujioka

(10) Patent No.: US 9,744,466 B2
(45) Date of Patent: *Aug. 29, 2017

(54) WIDGETIZED AVATAR AND A METHOD AND SYSTEM OF CREATING AND USING SAME

(71) Applicant: Mattel, Inc., El Segundo, CA (US)

(72) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 14/052,897

(22) Filed: Oct. 14, 2013

(65) Prior Publication Data

US 2014/0040066 A1 Feb. 6, 2014

Related U.S. Application Data

(63) Continuation-in-part of application No. 12/381,663, filed on Mar. 13, 2009, now abandoned, and a continuation-in-part of application No. 12/719,218, filed on Mar. 8, 2010, now abandoned, and a continuation-in-part of application No. 13/841,461, filed on Mar. 15, 2013, now abandoned, which is a continuation-in-part of application No. 12/709,710, filed on Feb. 22, 2010, now abandoned.

(60) Provisional application No. 61/069,336, filed on Mar. 13, 2008.

(51) Int. Cl.
G06F 3/048 (2013.01)
A63F 13/792 (2014.01)
G06Q 30/06 (2012.01)
A63F 13/63 (2014.01)
A63F 13/30 (2014.01)

(52) U.S. Cl.
CPC ............ *A63F 13/792* (2014.09); *A63F 13/12* (2013.01); *A63F 13/63* (2014.09); *G06Q 30/0601* (2013.01); *G06Q 30/0621* (2013.01); *A63F 2300/5553* (2013.01); *A63F 2300/6018* (2013.01)

(58) Field of Classification Search
CPC ............... G06Q 30/0601; G06Q 30/00; A63F 2300/5553; A63F 2300/6018; A63F 2300/575; A63F 13/79; A63F 13/69
See application file for complete search history.

(56) References Cited

U.S. PATENT DOCUMENTS

| | | | | |
|---|---|---|---|---|
| 7,685,023 B1* | 3/2010 | Abraham | ........... | G06Q 30/0603 705/27.2 |
| 8,533,610 B2* | 9/2013 | Fujioka | ................... | A63F 13/12 235/376 |
| 8,818,883 B2* | 8/2014 | Lawrence | ............... | G06F 3/011 705/26.1 |
| 2009/0115776 A1* | 5/2009 | Bimbra | ................... | A63F 13/69 345/419 |

(Continued)

*Primary Examiner* — Namitha Pillai
(74) *Attorney, Agent, or Firm* — Kolisch Hartwell, P.C.

(57) ABSTRACT

An upsell engine that provides a purchaser of a first item the opportunity to purchase a second item that is related to said first item. The first item may be a virtual item and the second item may be a real world item related to or a representation of the virtual item. The upsell engine preferably tracks the preferences or personal information of the user in order to upsell real world representations of the virtual item.

17 Claims, 6 Drawing Sheets

(56) References Cited

U.S. PATENT DOCUMENTS

| | | | |
|---|---|---|---|
| 2009/0144639 A1* | 6/2009 | Nims | A63B 24/0059 715/757 |
| 2010/0005424 A1* | 1/2010 | Sundaresan | G06F 17/30259 715/849 |
| 2010/0199200 A1* | 8/2010 | Fujioka | A63F 13/10 715/765 |
| 2015/0046847 A1* | 2/2015 | Nims | A63B 24/0059 715/757 |

* cited by examiner

WIDGETIZED AVATAR AND A METHOD AND SYSTEM OF CREATING AND USING SAME

CROSS REFERENCE TO RELATED APPLICATIONS

This application is a continuation-in-part of U.S. patent application Ser. No. 13/841,461, titled "Tablet Computer," filed Mar. 15, 2013, by inventor Robb Fujioka, which is a continuation-in-part of U.S. Non-Provisional patent application Ser. No. 12/709,710, titled "A Virtual Marketplace Accessible To Widgetized Avatars," filed Feb. 22, 2010, by inventor Robb Fujioka, the contents of which are expressly incorporated herein by this reference as though set forth in their entirety and to which priority is claimed. This application is also a continuation-in-part of U.S. Non-Provisional patent application Ser. No. 12/381,663, titled "A Widgetized Avatar and a Method and System of Creating and Using Same," filed Mar. 13, 2009, by inventor Robb Fujioka, the contents of which are expressly incorporated herein by this reference as though set forth in their entirety and to which priority is claimed. This application is also a continuation-in-part of U.S. patent application Ser. No. 12/719,218, titled "A Virtual Marketplace Accessible to Widgetized Avatars," filed Mar. 8, 2010, by inventor Robb Fujioka, the contents of which are expressly incorporated herein by this reference as though set forth in their entirety and to which priority is claimed. U.S. Non-Provisional patent application Ser. No. 12/381,663 claims the benefit under 35 U.S.C. 119(e) of U.S. Provisional Patent Application Ser. No. 61/069,336, titled "A Widgetized Avatar and a Method and System of Creating and Using Same," filedMar. 13, 2008, by inventor Robb Fujioka, the contents of which are expressly incorporated herein by this reference as though set forth in their entirety and to which priority is claimed.

FIELD OF INVENTION

The present invention is directed to avatars for use in computing communities. More particularly, the present invention is directed to the creation of clothing and accessories for avatars and a virtual marketplace accessible to widgetized avatars for conducting virtual and real world commerce. The real world commerce includes providing an upsell engine that offers articles of clothing, charms, and other accessories that are preferably related to the virtual article that was purchased for the avatar.

BACKGROUND

In modern times, the expansion of computer use into day-to-day life has created an entirely new concept of what exists. Many industries have embraced the concept of creating separate digital worlds, some mimicking the real world, and some mimicking fantasy worlds. When combined with the internet, these digital worlds allow people to interact with one another regardless of where the individual resides in the real world. Because people can interact with individuals from all over the world, large social networks have been created and due in part to the global scale of the communities, these large social networks have become immensely popular and robust.

Particularly, various rudimentary internet communities have sprung up, each with their own unique attributes. In order to interact with one another, various people create online personas, sometimes embodied by a three dimensional character. The character may be pre-selected, and often the character is customizable by a user. For example, many people might want to give their character specific clothing or accessories and the digital world might enable the user to do this.

One major facet of these online communities is that people create a connection to their character and the community in which the character resides. This has allowed developers of these communities to bring in revenue by providing characters with accessories by charging the user small fee. However, many people may wish to be even more connected to their character, yet there are few ways of actually achieving this goal. While it may seem unusual to an outside observer that a user might feel such a strong connection to what is considered a fictional creation, the character is real to the user.

With people spending more and more time in these online communities and forming such strong connections to the virtual world and their characters which reside therein, the lines between what is real and what is virtual seem to be blurring. To this end, people may want to express their virtual world characteristics in the real world.

U.S. Published Patent Application No. 2007/0168357, filed by Mo is an example of a reference that discloses a system for recommending merchandise that involves the creation of an avatar. The Mo system for virtual shopping includes a plurality of Internet apparel shopping malls. Mo further discloses using a user's personal information to create an avatar as well as a merchandise recommending system. Importantly, Mo fails to disclose that the avatar is portable and widgetized, such that said avatar may reside as a non-static content on at least two unique and partially static web pages. Further, Mo fails to that the items presented for sale, or recommended to the user are related to the personal information of said user. Mo also fails to disclose an upsell engine that provides a user with an option to purchase one or more additional items related to the item purchased by the user for the avatar, or that the upsell item can be a real world item for the user, not the avatar.

Thus, there exists a need for people to express characteristics of their virtual characters in the real world by wearing, using, or displaying clothing, charms, and other accessories that are related to the avatar or accessories purchased for the avatar.

BRIEF SUMMARY OF THE INVENTION

To minimize the limitations in the prior art, and to minimize other limitations that will become apparent upon reading and understanding the present specification, the present invention discloses a new and useful computer-based method for purchasing items in a virtual environment and then upselling the user on a related second item.

A computer-based method of creating and using a portable and widgetized avatar, comprising the steps: providing a networked server; wherein the server is comprised of an environment (or virtual environment) and an upsell engine; wherein the environment is comprised of one or more virtual storefronts, which preferably offer for sale a plurality of real world and virtual goods; providing at least one computer networked to the networked server; wherein the computer has a display; gathering a plurality of personal information from a user; creating an avatar on the computer, such that the avatar comprises a virtual likeness of a user based on the plurality of personal information; wherein the user accesses the avatar through the at least one computer; wherein the avatar is portable and widgetized, such that the avatar may reside as non-static content to at least two unique at least partially static web pages; wherein the avatar moves virtually through the environment and the one or more virtual storefronts; browsing by the avatar a plurality of items for sale (virtual and real world goods) in the one or more virtual storefronts; wherein the plurality of items for sale in the one or more virtual storefronts are related to the plurality of personal information of the user; purchasing by the user at least one of the plurality of items; and providing by the upsell engine an option to purchase one or more additional items related to the at least one item purchased by the user. The computer-based method of claim 1, wherein the at least one item purchased is a virtual item purchased for the avatar. Preferably, the one or more additional items is comprised of a real world item. Preferably, the real world item is a charm. Alternatively, the real world item is selected from the group of items consisting of an article of clothing and an accessory. Preferably, the virtual item purchased by the user for the avatar is a virtualized article of real world clothing. The virtualized article of real world clothing may be a designer brand. Alternatively, the at least one item purchased by the user for the avatar is an accessory. The computer-based method may further comprise the steps: equipping the avatar with the at least one item purchased; and displaying the equipped avatar on the display. Alternatively, the method may include the steps of equipping the avatar with one or more of the plurality of items for sale and displaying the equipped avatar on the display, such that the user can preview the equipped avatar before purchasing. In an alternative embodiment the at least one item purchased is a real world article; and wherein the one or more additional items is a virtual item. The plurality of personal information may be comprised of: one or more musical tastes of the user; one or more motion picture tastes of the user; a job status of the user; an educational status of the user; an age of the user; a location of the user; an income of the user; a marital status of the user; and one or more online communities with which the user is associated. Alternatively, the plurality of personal information may be comprised of information selected from the group of information consisting of: at least one of a user name; a user screen name; a handle; a trademark; and a text of interest. Alternatively, the plurality of personal information is comprised of at least one of the information selected from the group of information consisting of: a user name; a screen name; a purchase tool; a handle; one or more trademarks; one or more personal characteristics; one or more user interests; one or more user links; one or more user photos; one or more videos; one or more user friends; one or more user sayings; one or more jokes; one or more user notes; one or more connections; one or more message postings; a user clothing; one or more accessories; one or more activities; a user style; one or more musical tastes of the user; one or more motion picture tastes of the user; a job status of the user; an educational status of the user; an age of the user; a location of the user; an income of the user; a marital status of the user; and one or more online communities with which the user is associated. The avatar may comprise a trading card format; wherein the trading card format includes a searchable library; and wherein the searchable library allows the user to search one or more articles by a key word. The trading card format flips responsive to at least one of a selection selected from the group of selections consisting of: a drop-down menu; selection of a link; and a double click; wherein a flipped side of the trading card is comprised of a group of information selected from the information consisting of: age; interests; likes; dislikes; and employment status. The avatar may be associated with a plurality of expertise points indicative of an interaction with at least one computing community; wherein the avatar is searchable by the plurality of expertise points; wherein the plurality of expertise points are transferable and portable in conjunction with the avatar; wherein the plurality of expertise points are in accordance with feedback from a plurality of other users in the at least one computing communities in relation to the user's expertise in a particular area; and wherein the plurality of expertise points accumulate based on a plurality of expertise levels. Alternatively, the plurality of expertise points accumulate based on at least one of the group consisting of advice offered, amount of advice offered, and purchase of expertise from the user. The computer-based method may further comprise the step of: recommending by a recommendation engine one or more additional content based on at least one of a user's community, popularity, known expertise, clicks, interests, and searches. The computer-based method may further comprise the step of: displaying to the user, after the step of providing to the user the option to purchase the one or more additional items, a preview of the avatar associated with a selected one or more additional item.

One embodiment of the new method is a computer-based method for recommending a purchase, comprising: providing a networked server; wherein the server has at least one database, a recommendation engine; and an upsell engine; providing at least one computer networked to the networked server; providing an avatar; wherein the avatar corresponds to a profile of a user; wherein the user accesses the avatar through the at least one computer; purchasing at least a first item for association with the avatar, such that a purchase profile for the avatar is created; wherein the purchase profile takes into consideration of the at least one first item; relationally tracking by the at least one database the at least one first item purchased; monitoring the at least one database by the recommendation engine; recommending by the recommendation engine, in accordance with the monitoring, at least one second item; and at least one application of interest to the user; wherein the at least one second item is related to the avatar as determined by the purchase profile and wherein the at least one application of interest is determined by the purchase profile; providing to the user by the upsell engine an option to purchase the at least one second item and the at least one application of interest after the first item is purchased; displaying to the user simultaneously by the recommendation engine, the at least one application of interest, the at least one second item, the at least one first item, and the avatar. Preferably, the at least one first item is purchased via a micropayment purchase. Preferably, the at least one first item comprises a virtual accessory for the avatar. Preferably, the at least one second item comprise a real world charm. Alternatively, the at least one first item may be selected from the group of items consisting of: an avatar action and an avatar scene. Alternatively, the at least one second item is selected from the group of items consisting of: an avatar action and an avatar scene. Preferably, the recommendation engine further recommends a recommendation selected from the group of recommendations consisting of: a friend, a contact, a group, and a website of interest. Preferably, the friend is recommended for a social network environment. Preferably, the computer-based method, further comprises the step of: relationally tracking one or more interests of the user corresponding to the avatar by the at least one database. Preferably, the computer-based method further comprises the step of: relationally tracking one or more conversations of the user corresponding to the avatar by the at least one database. Preferably, the computer-based method further comprises the step of: relationally tracking one or more friends of the user corresponding to the avatar by the at least one database. Preferably, the displaying step is displayed on a homepage of the user. Preferably, the displaying step is displayed on a trading card of the avatar. Preferably, the computer-based method further comprises the step of: displaying one or more links of interest to the user, one or more widgets selected by the user, and one or more social network links of the user. Preferably, the purchase of the at least one first item is purchased via a rewards point system. Preferably, the purchase of the at least one second item is purchased via a rewards point system. Preferably, the at least one second item that is recommended for purchase to the user is a real world item. Preferably, the computer-based method further comprises the step of: displaying to the user, after the providing to the user the option to purchase the at least one second item and prior to this purchase, a preview of the avatar associated with the at least one second item.

It is an object of the invention is to overcome the deficiencies of the prior art.

It is another object of the invention to provide an upsell engine that offers a user the opportunity to purchase virtual or real world accessories that are related to a virtual or real world article purchased first.

Other features and advantages are inherent in the method claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

Figure 1:
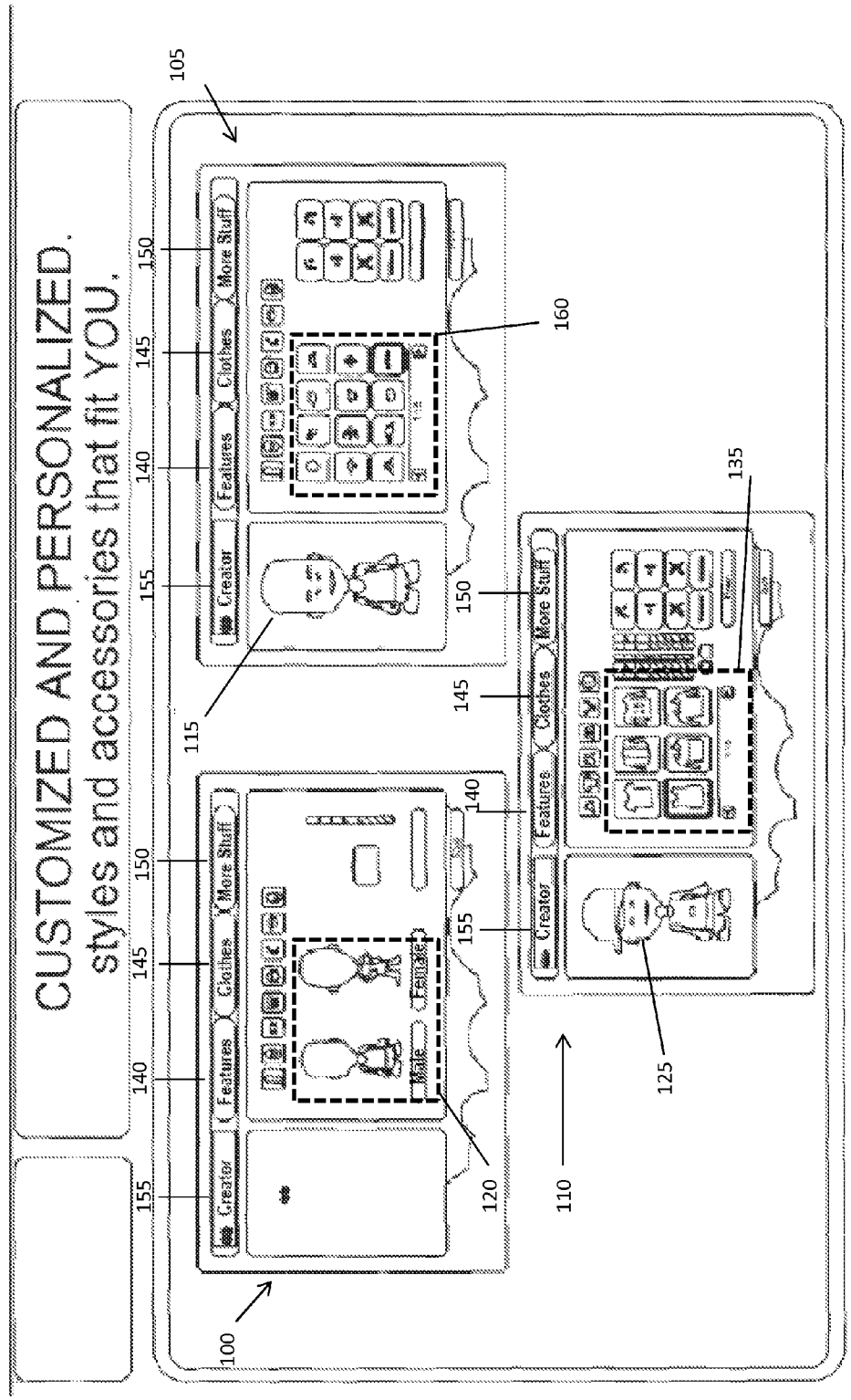
FIG. 1 is an avatar which may be customized and used in one embodiment of the invention.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, the term "electronic data processing unit" generally refers to any device that processes information with an integrated circuit chip, including without limitation, mainframe computers, control computer, embedded computers, workstations, servers, desktop computers, portable computers, laptop computers, telephones, smartphones, embedded computers, wireless devices including cellular phones, tablet computers, personal digital assistants, digital media players, portable game players, cloud based computers, and hand-held computers. The term "control computer" is generally any specially-purposed computer or electronic data processing unit that is integrated into a ventilation system and controls the gates, fans, and other mechanical devices of that system such that the air velocity and air volumes within the system are controllable by the control computer.

It is to be understood that the figures and descriptions of the present invention have been simplified to illustrate elements that are relevant for a clear understanding of the present invention, while eliminating, for the purpose of clarity, many other elements found in typical avatar and computing apparatuses, systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

An avatar is understood by one of ordinary skill in the art to include a computer user's representation of him or herself, such as in the form of a two or three dimensional model used in computer games, social network applications, or other on-line communities. A typical avatar may further include, or have associated therewith, a user's name, a user's screen name, a handle, or text of interest, such as a trademark, saying, or poem, for example.

A widget in accordance with the present invention, and as will be understood by one of ordinary skill in the art, is a portable portion of code that may be installed or executed within any separate HTML based webpage by an end user without necessitating additional compilation of that code portion. Such widget code portions, in accordance with the present invention, are embeddable by the end user. As such, a widget in accordance with the present invention is any code portion that may be embedded by the end user within a selected page of HTML, XML, or like code that causes presentation of that selected web page. The widget, via the embedded code portion, thereby adds non-static content to the subject webpage.

The system includes computer programming resident on at least one networked server, wherein the computer programming provides an online marketplace. A user access to the online marketplace includes a user-directed, computer programmable avatar, and further includes a computing device communicatively connected to the at least one networked server. An operator of the at least one virtual storefront may provide an auction transaction for at least one item with the user directed avatar.

FIG. 1 is an avatar which may be customized and used in one embodiment of the invention. As shown in FIG. 1, an avatar may be created and customized comprising: a first avatar creation screen 100; a user name area 155; a features tab 140; a clothes tab 145; a more stuff tab 150; an avatar gender selection area 120; a second avatar creation screen 105; a basic avatar 115; a features selection area 160; a third avatar creation screen 110; a personalized avatar 125; and a clothing selection area 135. Preferably, a user begins the avatar creation and customization process with the avatar creation screen 100. Preferably, while viewing the avatar creation screen 100 a user the avatar gender selection area 120 to select a gender for their avatar. The avatar creation screen 100 also contains a user name area 155 to identify the user creating the avatar. Preferably, the avatar creation screen 100 also contains a features tab 140, a clothes tab 145; and a more stuff tab 150. Preferably, the user reaches the second avatar creation screen 105 by selecting the features tab 140. In the second avatar creation screen 105 the user can see their basic avatar 115 and may then proceed to select features from the features selection area 160 in order to add feature to the basic avatar 115, thereby customizing the appearance of the avatar. In the third avatar creation screen 110, the user may view their personalized avatar 125 and select articles of virtual clothing from the clothing selection area 135 for the personalized avatar 125 to wear. Preferably, all the options available during the avatar creation process shown in FIG. 1 are available to the user even after the avatar has been created and fully customized. Preferably, the options presented to the user in the features tab 140, the clothes tab 145, and the more stuff tab 150 are shown to the user based on information provided by the user, whether the information is explicitly given by the user or if the information is gathered by monitoring the user's behavior and determining which items the user is most likely to be interested. For example, if through data collection it is determined that the user is a baseball fan, the objects featured in the clothing selection area 135 and more stuff tab 150 may comprise baseball jerseys, baseball caps, baseballs, and baseball bats.

Figure 2:
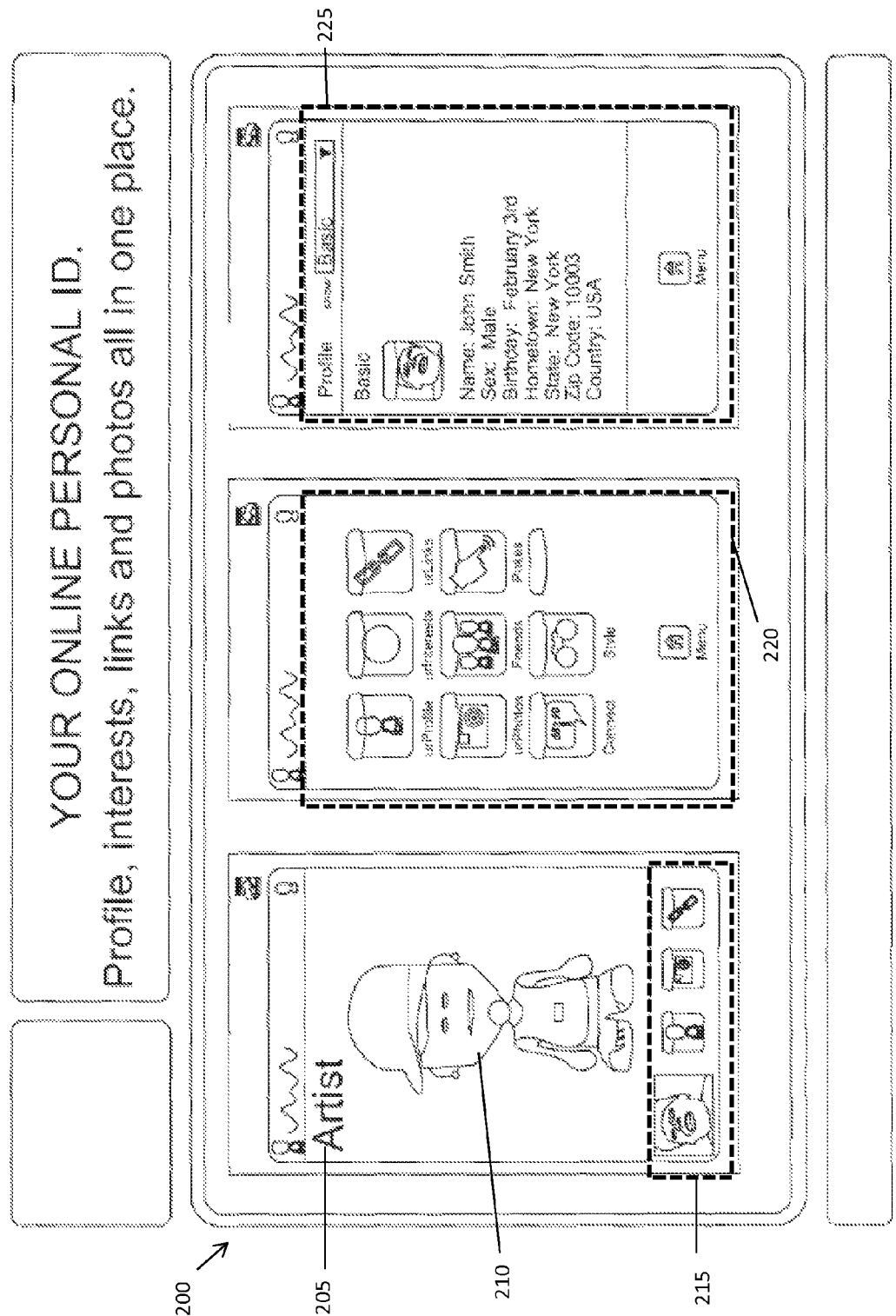
FIG. 2 is an avatar profile which may be used in one embodiment of the invention.

FIG. 2 is an avatar profile which may be used in one embodiment of the invention. As shown in FIG. 2 an avatar profile 200 (which is shown in a trading card format) preferably comprises: an avatar descriptor 205; an avatar 210; an avatar navigation panel 215; a navigation panel 220; and a basic information panel 225.

Figure 3:
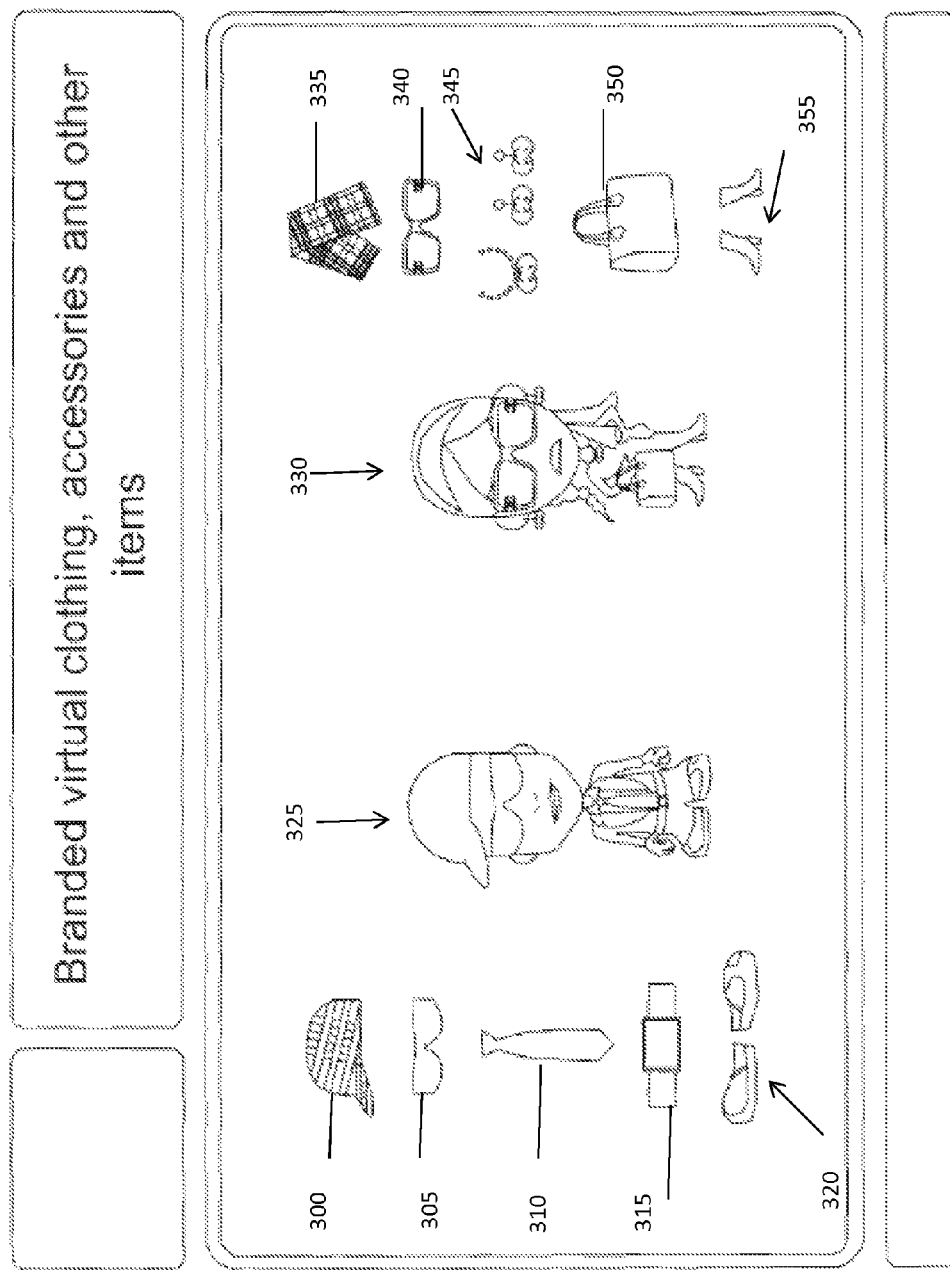
FIG. 3 is a depiction of two avatars which may be used in one embodiment of the invention.

FIG. 3 is a depiction of two avatars which may be used in one embodiment of the invention. As shown in FIG. 3, a male avatar 325 may be customized by accessories comprising a hat 300; a pair of sunglasses 305; a tie 310; a belt 315; and shoes 320. Also shown in FIG. 3, a female avatar 330 may be customized by accessories comprising a scarf 335; a pair of glasses 340; one or more articles of jewelry 345; a handbag 350; and high heels 355. It is understood that this list is not exhaustive, and many more items may be used to customize the user's avatar.

Figure 4:
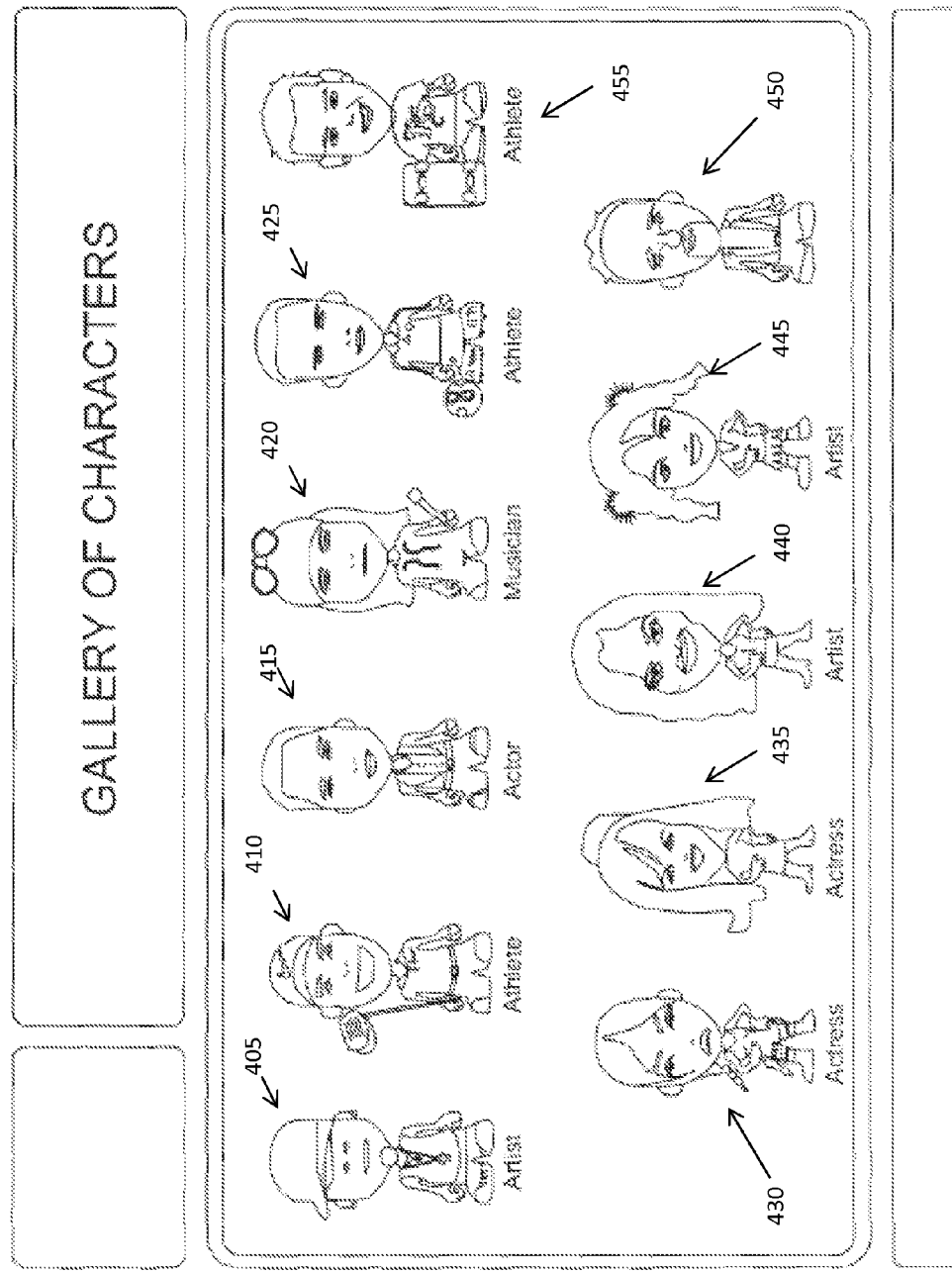
FIG. 4 is a plurality of avatar types which may be used in one embodiment of the invention.

FIG. 4 is a plurality of avatar types which may be used in one embodiment of the invention. As shown in FIG. 4 the plurality of avatar types comprise: artist 405; athlete 410; actor 415; musician 420; athlete 2 425; athlete 3 455; actress 430; actress 2 435; artist 2 440; artist 3 445; and generic 450. Preferably, this plurality of avatar types are pre-generated or generated by the user's command inputs.

Figure 5:
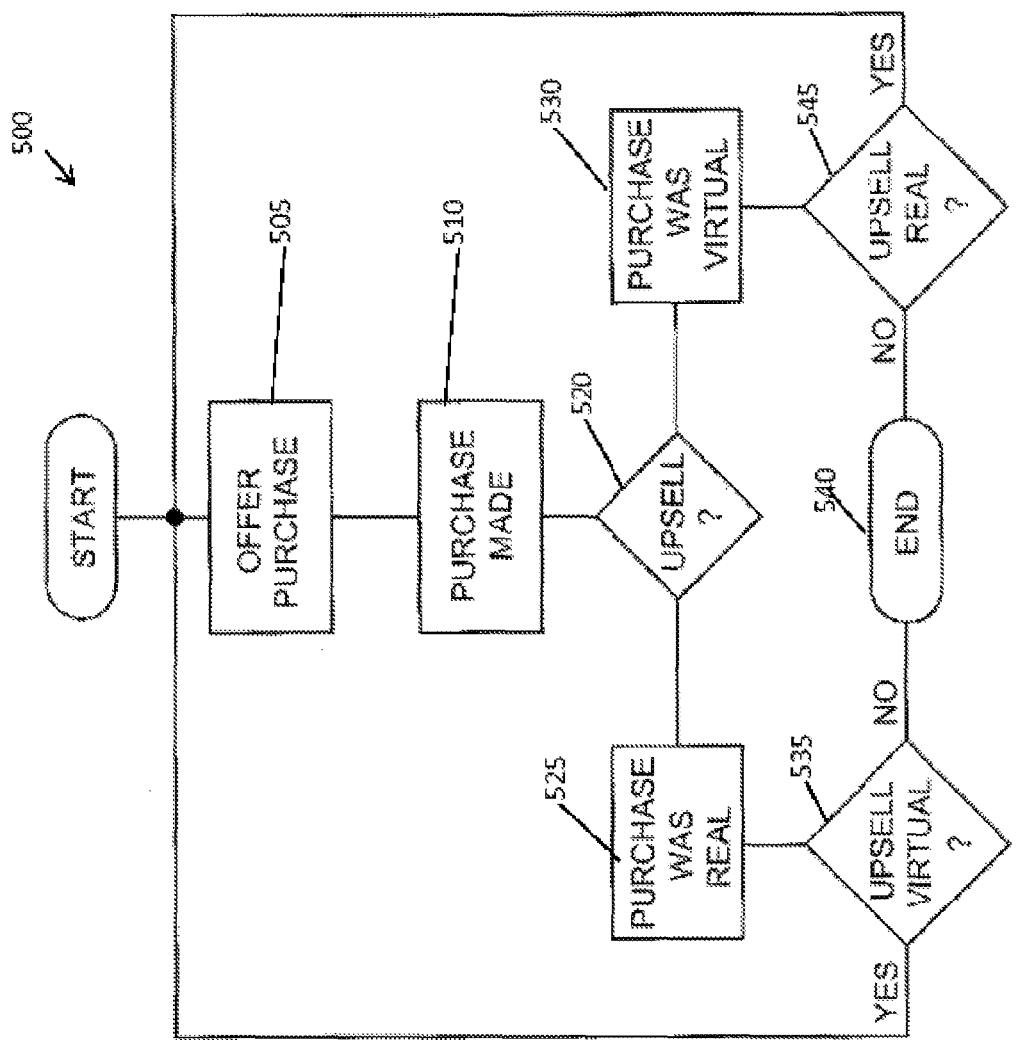
FIG. 5 illustrates a flow diagram of one embodiment of the invention.
Figure 6:
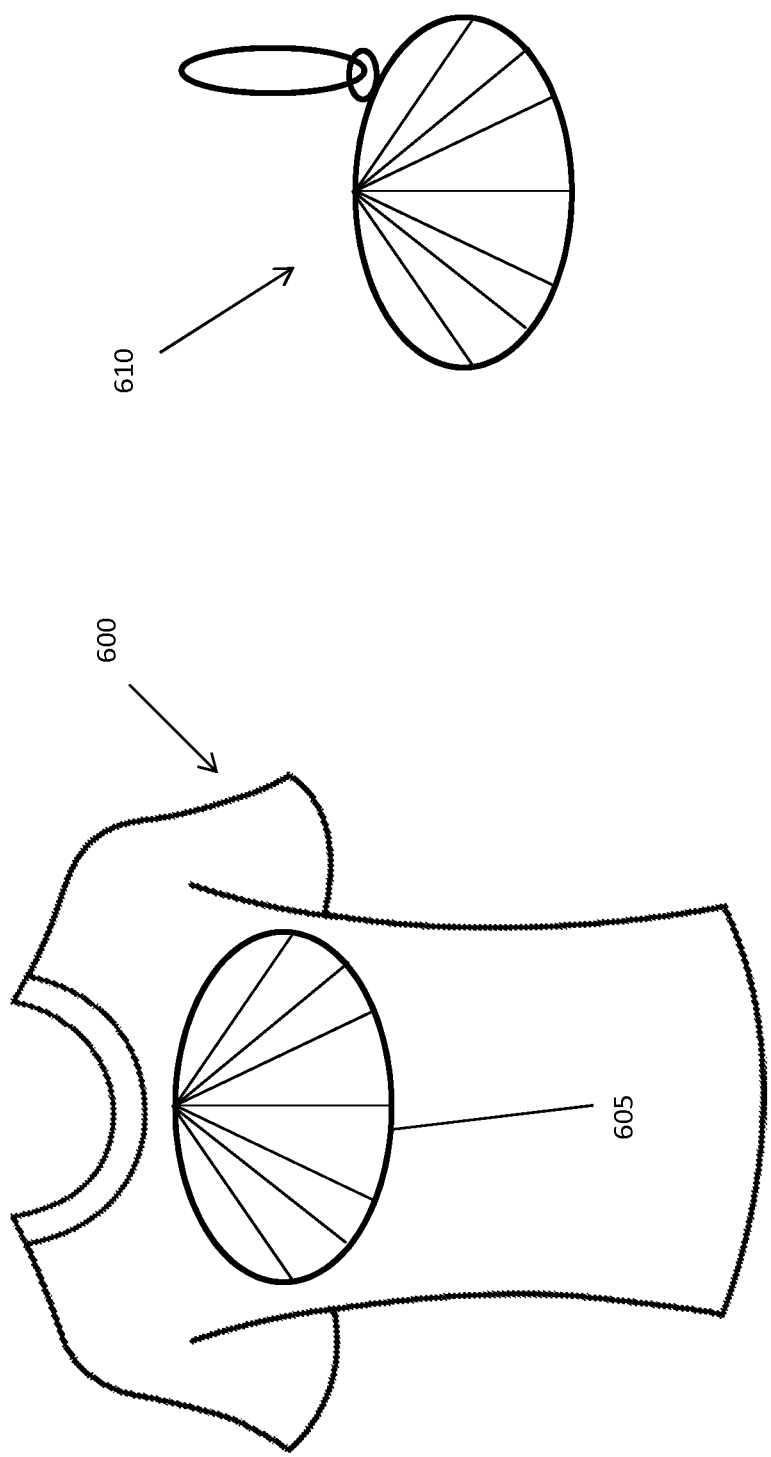
FIG. 6 is a representation of a virtual shirt and corresponding real world charm which may be used in one embodiment of the invention.

FIG. 5 illustrates a flow diagram of one embodiment of the invention. As shown in FIG. 5, one embodiment of the invention comprises a flow diagram comprising: offers a purchase 505; makes a purchase 510; upsell 520; a real purchase 525; a virtual purchase 530; a virtual upsell 535; a real upsell 545; and an end 540. Preferably, when a software offers a purchase 505 and a user makes a purchase 510, an upsell 520 is made dependent upon whether a real purchase 525 or a virtual purchase 530 was made. In cases where a real purchase 525 occurs, a virtual upsell occurs 535. In cases where a virtual purchase 530 occurs, a real upsell occurs 545. If a virtual upsell 535 or real upsell 545 is not performed, the flowchart reaches an end 540. If a virtual upsell 535 or real upsell 545 is performed, the flowchart begins again with the offers a purchase 505. Preferably, when the user purchases, selects, or shows interest in the accessory for the avatar, an option appears allowing the user to make a real world purchase of a charm relating to the accessory for the avatar. For example, if a virtual purchase 430 of a virtual shirt with a pattern on it is made, a real upsell 545 of a charm with the same or similar pattern of the shirt is made. Alternative, the charm may be a literal representation of what the virtual item looks like. The charm may be a charm which attaches to such items comprising: jewelry; earrings; necklaces; rings; computers; laptops; pens; mugs; cufflinks; phones; cell phones; tablets; handbags; briefcases; chairs; eyeglasses; shoes; sandals; flip-flips; belts; pants; shirts; jackets; monitors; binders; notebooks; pencil bags; pencil boxes; pencils; wallets; purses; door handles; drawer handles; oven handles; rearview mirrors; key chains; keys; artwork; hairbands; ears; chains; bicycles; bicycle locks; car hitches; watches; headphones; luggage; cameras; bookmarks; laser pointers; flashlights; animal collars;

FIG. 6 is a representation of a virtual shirt and corresponding real world charm which may be used in one embodiment of the invention. As shown in FIG. 6, items which may be used in one embodiment of the invention are a virtual shirt 600; a pattern on the virtual shirt 605; and a real world charm 610. Preferably, the real charm 610 may be a representation of or related to the pattern on the virtual shirt 605. The real charm 610 and pattern on the virtual shirt 605 should be related such that a user in possession of the charm is reminded of the virtual shirt 600 and/or the pattern on the virtual shirt 605 by the real charm 610. The charm 610 may be offered to the user via the upsell engine. Of course, rather than a charm, the real world upsell item/accessory may be an article of clothing of other type of accessory or tchotchke type of an item.

The present invention preferably includes a fully portable, widgetized avatar 100 having associated therewith multiple items of social information (e.g., clothes 102 and facial features 104) that are generally requested for association with at least two different computing communities or transactions. Widgetization of the avatar 100 of the present invention necessarily allows for portability of the avatar 100 of the present invention. For example, creation of a typical avatar 100 in accordance with the present invention may include the association of physical features, such as facial 106 and hair 108, with the subject avatar 100, as well as the aforementioned user name area 155, as shown in FIG. 1. Further, a myriad of additional information may be associated with the avatar 100, wherein such information is generally required or desired for use in computing communities or transactions. This information may be organized into multiple levels of detail, and/or multiple levels of accessibility to third parties in a computing community or transaction. Such levels of accessibility may be selected by the creator of the widgetized avatar 100 based on characteristics of the third party endeavoring to access the subject avatar 100. For example, a user may have basic information panel 225, which may be selectable for viewing by all registered users of a particular community, as shown in FIG. 2.

In an exemplary embodiment, a user may have likes or dislikes, such as musical or motion picture tastes, job or educational status, age, location, income, marital status, and other computed communities with which that user is associated, associated with his or her avatar. The present invention provides a physical manifestation of all of this information, such as in a "trading card" format 200. For example, FIG. 2 illustrates an avatar wherein the front of the virtual trading card includes an avatar having particular physical features, clothing, accessories, activities, and the like, along with an associated user name. However, when an interaction, such as selection of a drop-down menu, selection of a link, a double click, or the like is undertaken to "flip" a trading card to the back, a myriad of additional information is displayed regarding the user related to the widgetized avatar, such as age, interests, likes and dislikes, employment status, and the like.

Needless to say, because the virtual manifestation of the physical trading card is embodied in the computing code that provides for the virtual manifestation, such computing code may be provided in such a normalized format that it is easily adopted into multiple computing communities, and/or may be adopted as non-static content onto multiple different web pages. As such, the subject avatar may be incorporated into multiple social communities, fantasy sports communities, blogs, and the like. Further, avatars of particular interest to the general public, such as trading card avatars of musical artists or other famous persons, may be downloaded or referenced by fans of such famous persons. Such avatars may, in fact, be presented in non-classical formats, such as through a tab presentation on a web page designed by the user as a home page in a certain community, or that is set forth by a particular computing community. Such "celebrity" avatars, including in such non-classical formats, may include presentations or allow for interactions with celebrity suggestions or favorites, such as recipes, music, concerts, movies, talk shows, reality shows, or the like, and may further allow for purchases from or related to such suggestions or favorites.

As referenced hereinabove, a typical avatar may have associated therewith certain physical features, clothing, accessories or activities. As such, the present invention is and includes a tool whereby such physical features, clothing, accessories, and activities may be taken from the real world and "virtualized," for use with a subject avatar, as shown in FIG. 3. For example, famous clothing lines, such as Vera Wang clothing, or famous shoe lines, such as Nike sneakers, or famous accessories, such as Kate Spade purses, or well known activities, such as playing for the Philadelphia Phillies, may be virtualized for use with an avatar. As such, virtualized items may be made available for sale for use with an avatar just as the corresponding real items are generally for sale for use with the real world user correspondent to the avatar. Likewise, celebrity avatars may be presented as "model" widgetized avatars, and the user may be enabled to purchase those items worn by the celebrity's avatar, and/or that are endorsed by that celebrity, as shown in FIG. 4.

Thereby, for example, during creation of a discreet widgetized avatar and/or a widgetized avatar to be associated with the aforementioned avatar trading card, the user creating the avatar may have available a selectable library of options for association with the subject avatar, such as a searchable library of options searchable by key word, or a hierarchal library of options presented by topic. For example, under "fashion", a user may be presented with available virtual clothing lines for the avatar by piece of clothing. For example, under "shirts", the user may be presented with options such as Jones New York, Tommy Hilfiger, Fubu, Major League Baseball, National Football League, and the like. The user may then select one of the presented fashion topics for shirts, and then may be presented with the entire line of "real world" shirts associated with that fashion line, but, of course in a virtualized format. Thus, for example, upon selection of Major League Baseball, the user may be presented with a series of major league baseball team jerseys for association with that user's avatar. Needless to say, the user may then select the baseball jersey of that user's favorite team, and may in fact pay for the use of that virtual jersey just as the user might pay for the purchase of a real world jersey of that user's favorite baseball team. Similarly, fashion lines of pants, dresses, suits, shoes, and the like may be made available for use with avatars, and may in fact be made available for purchase by users for use with avatars. Likewise, accessories or activities that would require purchase in the real world by the user may additionally allow for purchase of such accessories or activities in the virtual world for use with the user's widgetized avatar.

Additionally, the present invention may provide an up sell engine as illustrated in FIG. 5. The upsell engine may operate, upon purchase of a virtual item for association with the user's avatar, may present the user with an opportunity to purchase the same or similar article in the real world for real world use by the actual user based on that user's known preference for that article as evidenced by the purchase of the virtual article for use with the user's avatar. The upsell engine may additionally or alternatively include presentation to the user of an advertisement for real world articles that are the same as or associated with the virtual article purchased by the user, or may allow for presentation of advertising related to likely related virtual or real world articles of interest to the user based on the user's expressed preference for the particular virtual article selected. Needless to say, the present invention may also be used to upsell in the inverse situation—that is, the situation in which the user purchases a real world article from a particular web site, or surfs a particular web site for real world goods and/or services, may cause the user to be presented with advertising for the purchase of the same or similar virtual articles, or associated or related virtual articles, or to be presented with a direct opportunity to purchase the same, similar, or related virtual articles at the point of purchase of the particular real world article.

Additionally, the upsell engine may present the user with an opportunity to purchase an article related to a virtual item purchased. For example, if a user were presented with an option to purchase a virtual article of clothing, the upsell engine may present the user with the ability to purchase a real word item which shares similar design elements or includes a feature of the virtual article of clothing. Specifically, if a user were to purchase a virtual hat for an avatar, the user may be presented with an option to purchase a real world item, comprising charms, shirts, articles of clothing, and trinkets, which bears a similar design, pattern, symbol as the virtual hat or the real world item is in some way related to the virtual hat. Conversely, if a user were to purchase a real world item, they may be given the opportunity to purchase a virtual item that relates in a similar way as described above, that is, the virtual item may be related in ways comprising design, symbol, and pattern to the real world item in addition to the virtual item being related in some way to the real world item. For example, the user may be given an offer to purchase 505, and when a purchase is made 510 by the user, the user may be given the option to up sell 520—i.e., the user may be given the opportunity to purchase the same or similar article in the real world 525 or the same or similar article in the virtual world 530. If the user made a real world purchase of the article and the upsell was for a virtual item 535, the process flow of the upsell engine 500 restarts again; otherwise, the decision-tree of the upsell engine 500 ends 540. Conversely, if the user made a virtual purchase of the article and the upsell was for a real item 545, the upsell engine 500 restarts again; otherwise the decision-tree of the upsell engine 500 ends 540.

Further, the present invention may allow for association of particular levels of expertise with particular areas of interest as related to the avatar trading card. As such, the user associated with the subject avatar may take a rating of that user's expertise in certain areas from computing community to computing community. Thus, searches may be made available in one or more computing communities for persons having desired levels of expertise in certain areas. The user may thus accumulate expertise points in multiple computing communities at the same time, wherein such points may be associated with that user's transferable widgetized avatar, whereby a user's expertise may rise based on accumulated expertise points. Additionally and alternatively, a user's expertise in a certain area may increase based on feedback from other users in one or more computing communities in relation to the subject users expertise in a particular area, or a user's expertise may increase based on an assignment of expertise levels by one or more of the computing communities, or a user's expertise level may rise based on advice offered, amount of advice offered, or purchase of expertise or advice from that user in or more on-line computing communities. Thus, a search by a party in need, such as a key word search, for an expert in a particular area and may not return a user advertising to be an expert in a particular area, but instead may return a user adjudged to be an expert in a particular area by parties other than that user him or himself. Of course, in accordance with the present invention, such expertise levels may be associated with the avatar or avatar trading card, and as such may be subsequently transferred to other computing communities.

Users may browse through a virtual store in a manner similar to browsing in a real store. An avatar may enter different stores and look through merchandise. Such merchandise may be categorized based on a user query, or simply visible on-screen by type, for example. The virtual mall may thus provide virtual and/or online shopping, social networking, multiplayer games, movies and entertainment and the like. A user may interact with other mall shoppers, in real time or on a time delay, and may include seeking the best deals in groups, or "resting" virtual feet at a food court while catching up on the latest gossip or entertainment news.

Further, according to an aspect of the present invention, information regarding the user may be resident within the avatar of the present invention. This user and/or expertise information, as discussed above, may be used to populate a store or mall, wherein the stores offerings may be directed to the user profile associated the shopping avatar, or wherein the store provides offerings based on areas of expertise of the avatar of the storefront "owner." For example, if user is interested in cars, such as European sports cars, for example, and this information is associated via the widget with the avatar, an automotive store may be provided by the mall to that user, with the "shelves" stocked with virtual and/or real/world parts for European sports cars, or cars, or car auctions, for example. Additionally, the sports car store may be an offering by a qualified expert in such cars, and as such, the user avatar may interact with an expert, namely the store "owner," while shopping in the owner's virtual store. That is a user may interact with store personnel while shopping, such as via a chat.

Programming for the virtual mall and individual storefronts may be constructed in any programming language and may include any formatting as would be understood by those skilled in the art. Further, such programming may reside on a server or server network, via a locally run widget, or any combination of programming schemes. Storefronts may also be linked to existing e-commerce websites, or webstores. For example, the simulated virtual mall may take the form of an online interactive platform resident on a server network, and it may include various storefronts for users to enter and interact with each other via their avatars. In certain embodiments, there may be an unlimited number of storefronts within the virtual mall. In other embodiments, the number of storefronts may be limited. In either case, the operator or "owner" of the virtual mall may optionally "lease" available space for a storefront, and a user may place their own storefront into the available space for a period of time, such as via a locally run widget. It should be appreciated that the virtual mall and any storefronts therein may conduct business in the same manner as a real world mall, and thus a virtual micro-economy may be constructed as desired by the virtual mall and storefront operators, individual users, and user groups.

It should be appreciated that the shopping experience within the virtual mall environment may include any product transaction mechanism, including point-of-sale, auction-style bidding, bartering, raffle or prize-winning, and may further include any indirect or intermediary component, person, avatar or entity as would be understood by those skilled in the art. Transactionable items may include new and used items, virtual and real world items, virtual and real world services, or any combination of such goods and services.

For example, the virtual mall may include an auction storefront, which may be a generic auction site, or may be a branded site, such as an "eBay® store". A user, via his or her associated avatar, may enter the store and select virtual and/or real world items to bid on for purchase, or new or used items, or to place virtual and/or real world items up for auction, just as a user would at a brick and mortar auction or online website. In certain embodiments of the present invention, a user may access "masters" or "experts" associated with the subject items, to find the best or most competitive values or pricing points for those items, to find suggested auctions or items for purchase, or to review such items for quality, or any other informational aspect that might be useful to the user and his or her avatar. In other embodiments, the auction storefronts may associate data indicative of incoming bids for items, or the remaining time before the auction closes, with a user or the user's avatar. This would allow the user or avatar to obtain real-time data for the items they are bidding on or selling without having to be "physically" present within the auction storefront, just as a real world user would be able to receive email or text updates on their auctions without having to be logged onto the auction website. Further, stores, auctions, or the like may be recommended to a user based on the user preferences associated with the avatar.

In another example, the virtual mall may include an intermediary merchant storefront, similar to a department store or the online Amazon.com® website. These storefronts may either sell third party branded, virtual and/or real world items, or they may re-brand or dual-brand such items for their own marketing purposes. These items may be new or used, for example. For ease of use, such storefronts may be linked to their existing webstores, or to other third party webstores, such that the users may effectively browse and shop with greater variety while remaining within the same "storefront".

In yet another example, the virtual mall may take the form of a marketplace, where virtual and/or real world goods may be traded between users via their avatars. Of course, such trading may include any form of virtual or real world currency, credit, or reward or loyalty points, or any other valuation mechanism, in combination with the items exchanged in the marketplace. Thus, it should be appreciated that the "marketplace" may utilize any of the transactional mechanisms of commerce, as described herein.

Thus, the avatar of the present invention enables a user to create a portable, fully virtual "person" for association with that user and carrying the characteristics of that user, including a personal profile and identification card that can be used in combination with any web page, webtop or desktop and any computing community, transaction or social networking situation. Thereby, the avatar of the present invention allows users to connect with other users and share ideas, content, expertise, and applications. Further, the avatar of the present invention thus assists in viral growth by offering users of certain or multiple computing communities an avatar that keeps all personal profile information in one transportable place. Additionally, the avatars of the present invention may provide a foundation for a recommendation and expertise engine employing an algorithm that may suggest content or an expert based on a user's community, popularity, known expertise, clicks, interests, searches, or the like.

Thus, the avatar of the present invention may include one or more of the user profile, physicality of avatar, user personal characteristics, user interests, user links, user photos, videos, or audio, user friends, user sayings, jokes, or the like, user notes, connections or message postings, and user clothing, accessories, activities and general style. As used herein, the computing communities and transactions to which the avatar of the present invention may be transferred include all computing communities, including telecommunications communities such as those accessible from cellular telephones, televisions, and the like.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A computer-based method of creating and using a portable and widgetized avatar, comprising the steps:
   providing a networked server;
   wherein said server is comprised of an environment and an upsell engine;
   wherein said environment is comprised of one or more virtual storefronts;
   providing at least one computer networked to said networked server;
   wherein said computer has a display;
   gathering a plurality of personal information from a user;
   creating an avatar on said computer, such that said avatar comprises a virtual likeness of a user based on said plurality of personal information;
   wherein said user accesses said avatar through said at least one computer;
   wherein said avatar is portable and widgetized, such that said avatar may reside as non-static content to at least two unique at least partially static web pages;
   wherein said avatar moves virtually through said environment and said one or more virtual storefronts;
   browsing by said avatar a plurality of items for sale in said one or more virtual storefronts;
   wherein said plurality of items for sale in said one or more virtual storefronts are related to said plurality of personal information of said user;
   purchasing by said user at least one of said plurality of items;
   determining, by said upsell engine, whether the at least one item purchased by the user is a real world item or a virtual item for the avatar; and
   providing, by said upsell engine, an option to purchase one or more additional items related to said at least one item purchased by said user, wherein the one or more additional items are one or more virtual items for the avatar when the at least one item purchased by the user is determined to be a real world item, and wherein the one or more additional items are one or more real world items when the at least one item purchased by the user is determined to be a virtual item for the avatar.

2. The computer-based method of claim 1, wherein said real world item is a charm.

3. The computer-based method of claim 1, wherein said real world item is selected from the group of items consisting of an article of clothing and an accessory.

4. The computer-based method of claim 1, wherein said virtual item purchased by said user for said avatar is a virtualized article of real world clothing.

5. The computer-based method of claim 4, wherein said virtualized article of real world clothing has a designer brand.

6. The computer-based method of claim 1, wherein said at least one item purchased by said user for said avatar is an accessory.

7. The computer-based method of claim 1, further comprising the steps:
equipping said avatar with said at least one item purchased; and
displaying said equipped avatar on said display.

8. The computer-based method of claim 1, further comprising the steps:
equipping said avatar with one or more of said plurality of items for sale and displaying said equipped avatar on said display, such that said user can preview said equipped avatar before purchasing.

9. The computer-based method of claim 1, wherein said plurality of personal information is comprised of: one or more musical tastes of said user; one or more motion picture tastes of said user; a job status of said user; an educational status of said user; an age of said user; a location of said user; an income of said user; a marital status of said user; and one or more online communities with which said user is associated.

10. The computer-based method of claim 1, wherein said plurality of personal information is comprised of information selected from the group of information consisting of: at least one of a user name; a user screen name; a handle; a trademark; and a text of interest.

11. The computer-based method of claim 1, wherein said plurality of personal information is comprised of at least one of the information selected from the group of information consisting of: a user name; a screen name; a purchase tool; a handle; one or more trademarks; one or more personal characteristics; one or more user interests; one or more user links; one or more user photos; one or more videos; one or more user friends; one or more user sayings; one or more jokes; one or more user notes; one or more connections; one or more message postings; a user clothing; one or more accessories; one or more activities; a user style; one or more musical tastes of said user; one or more motion picture tastes of said user; a job status of said user; an educational status of said user; an age of said user; a location of said user; an income of said user; a marital status of said user; and one or more online communities with which said user is associated.

12. The computer-based method of claim 1, wherein said avatar comprises a trading card format.

13. The computer-based method of claim 12, wherein said trading card format includes a searchable library; and
wherein said searchable library allows said user to search one or more articles by a key word.

14. The computer-based method of claim 12, wherein said trading card format flips responsive to at least one of a selection selected from the group of selections consisting of: a drop-down menu; selection of a link; and a double click; and
wherein a flipped side of said trading card is comprised of a group of information selected from the information consisting of: age; interests; likes; dislikes; and employment status.

15. The computer-based method of claim 1, wherein said avatar is associated with a plurality of expertise points indicative of an interaction with at least one computing community;
wherein said avatar is searchable by said plurality of expertise points;
wherein said plurality of expertise points are transferable and portable in conjunction with the avatar; wherein the plurality of expertise points are in accordance with feedback from a plurality of other users in the at least one computing community communities in relation to the user's expertise in a particular area; wherein said plurality of expertise points accumulate based on a plurality of expertise levels; and
wherein the plurality of expertise points accumulate based on at least one of the group consisting of advice offered, amount of advice offered, and purchase of expertise from the user.

16. The computer-based method of claim 1, further comprising the step of:
recommending by a recommendation engine one or more additional content based on at least one of a user's community, popularity, known expertise, clicks, interests, and searches.

17. The computer-based method of claim 1, further comprising the step of:
displaying to said user, after said step of providing to said user said option to purchase said one or more additional items, a preview of said avatar associated with a selected one or more additional items.

* * * * *